United States Patent [19]

Tobler

[11] Patent Number: 4,547,053
[45] Date of Patent: Oct. 15, 1985

[54] BELLOWS ASSEMBLY FOR PHOTOGRAPHIC CAMERAS

[75] Inventor: Werner Tobler, Aitrach, Fed. Rep. of Germany

[73] Assignee: Firma Novoflex Fotogerätebau Karl Müller, Memmingen, Fed. Rep. of Germany

[21] Appl. No.: 489,212

[22] Filed: Apr. 27, 1983

[30] Foreign Application Priority Data

May 8, 1982 [DE] Fed. Rep. of Germany ....... 3217412

[51] Int. Cl.$^4$ .......................... G03B 7/08; G03B 17/04
[52] U.S. Cl. .................................. 354/187; 354/286; 354/295
[58] Field of Search ............... 354/485, 187, 194, 192, 354/193, 286, 295, 158

[56] References Cited

U.S. PATENT DOCUMENTS 3,670,639  6/1972  Harnden, Jr. ...................... 354/485
4,196,997  4/1980  Ohmori et al. ...................... 354/286

Primary Examiner—Russell E. Adams
Attorney, Agent, or Firm—Holman & Stern

[57] ABSTRACT

The invention is designed for photographic cameras which incorporate a bellows and require electrical connections between the parts separated by this bellows. To provide a non-obtrusive and adaptable form of this electrical connection this invention provides flat, flexible electrical leads arranged between layers of the bellows and participating in undulating movements of the latter. The ends of these leads may be connected to contact-carrying plates which cooperate with contacts on the camera and for replaceable lenses of the latter.

6 Claims, 2 Drawing Figures

BELLOWS ASSEMBLY FOR PHOTOGRAPHIC CAMERAS

BACKGROUND OF THE INVENTION

The primary nexus of the invention lies in photographic equipment in which a bellows is provided between two relatively movable parts, such as the lens and the body of a camera, and more particularly with the system in which there is a fitting or frame supporting two relatively movable uprights connected to the parts referred to.

Further there are photographic cameras where electrical connection is required between the lens and the camera body, primarily to transmit signals from the lens to the camera, for example to tell the latter what lens is being used. These signals are then used to correspondingly set the camera, for example as regards the exposure period.

Photographic cameras are also known in which the lens is operated electrically or the prevailing setting of the lens of the camera is signalled thereby. In these cases also electrical connections are provided between the lens and the camera.

Where lenses are removable from a camera, for example to be replaced by another lens, contacts for these electrical couplings need to be provided between the camera and the lens.

Where photographic cameras with electrical connections of these various kinds are to be used with a bellows assembly of the kind already indicated it is necessary to provide electrical connections between the uprights of the assembly. Since the spacing between the two uprights the rear one of which may carry the camera body and the front one the lens is to be variable the electrical connections must be adaptable to this change in spacing. The use of cables as electrical connections, for example mounted on the frame of the bellows assembly, leads to awkward and expensive constructions. Cable connections of this kind are also liable to damage.

SUMMARY OF THE INVENTION

It is an object of the present invention to provide electrical connections in a bellows assembly of the type set forth above which involve a minimum of bulk and will operate reliably for an extended period. To meet this object, in the invention the bellows incorporates thin electrical leads electrically connecting said uprights and foldable with the body of the bellows. The invention provides a surprisingly simple solution to the problem. Since the bellows is a foldable structure, to compensate for and bridge the change in spacing between the uprights, there is no notable additional problem in exploiting this folding construction for guiding and mounting the electrical conductors. When the electrical leads are made adequately thin they can be folded in exactly the same way as the material of the bellows, thus acquiring the advantage that the bellows is used at least partially as a support and protective construction for the leads. In a preferred embodiment of the invention the leads are made as strips of thin foil.

The conductors may for example be cemented to the material of the bellows and provided with a protective covering layer. Since the bellows generally will be composed of two layers, for example an inner fabric layer and an outer impervious plastic foil layer, the electrical leads may be arranged between them to avoid the need for additional guiding and insulating means.

It is advisable that at least one of the uprights, and preferably both of them shall carry plates to which the ends of the leads are connected by cementing.

It is advantageous and will simplify the construction where the ends of the foil strips are directly brazed to the conductor plates.

BRIEF DESCRIPTION OF THE DRAWINGS

An embodiment of the invention is diagrammatically illustrated in the accompanying drawings in which.

DETAILED DESCRIPTION OF THE DRAWINGS

Figure 1:
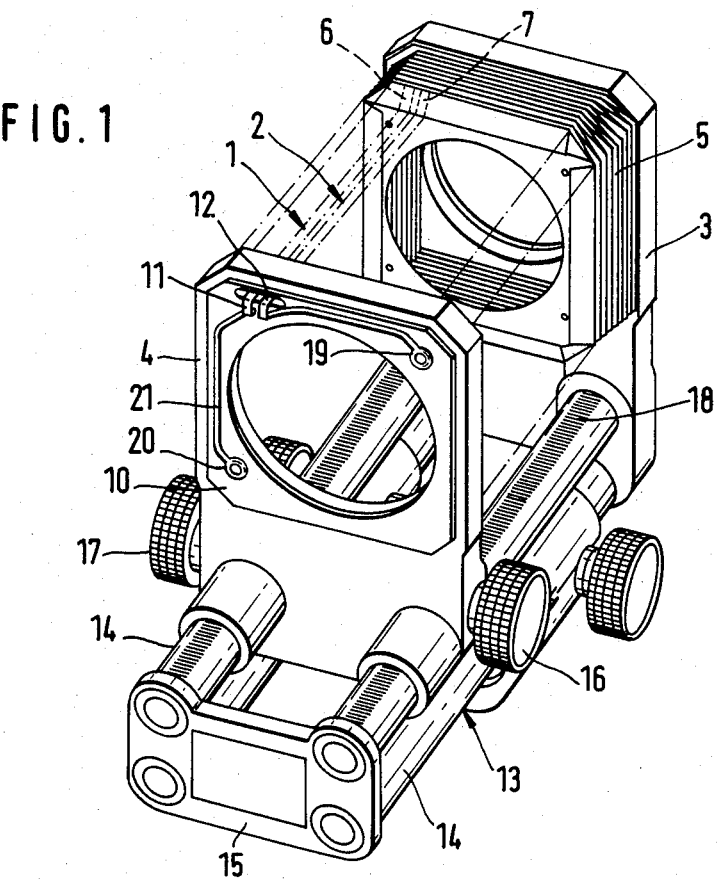
FIG. 1 is a perspective illustration of a bellows assembly of a form envisaged by this invention.

The bellows assembly illustrated in FIG. 1 comprises a basic frame which includes four rods 11 which at their leading ends 14 are connected by a plate 15 and at their rear ends are received in a rear upright 3. A front upright 4 of the frame is slidable in guided fashion on the upper two rods 14 to vary the distance between the uprights. A bellows 5, shown collapsed in FIG. 1, is connected between the uprights 3 and 4. The shifting and fixing of upright 4 to vary the spacing is effected by adjusting and retaining knobs 16 and 17 acting through teeth 18.

In practical use of the assembly the front upright 4 carries the lens and the rear upright 3 is connected to the camera. Neither of these is illustrated in the drawings.

The front upright 4 has at the front side a plate 10 carrying contacts 19 and 20 for cooperation with countercontacts which will be carried by lenses when mounted on upright 4. The contacts 19 and 20 are electrically connected to the anchorage points 11 and 12, as by connections 21. Secured, for example brazed, to the plate 10 are the ends 11 and 12 of electrical connections 1 and 2 which extend between the uprights (see below).

A plate of a form and function similar to that of plate 10 may be carried by upright 3.

Figure 2:
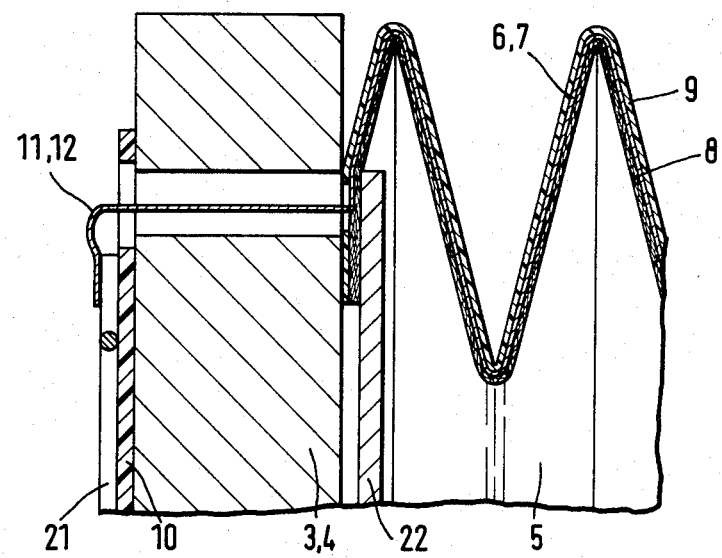
FIG. 2 is an enlarged sectional detail of a part of the bellows and one of the uprights of the assembly shown in FIG. 1.

The electrical connections 1 and 2 primarily comprise leads 6 and 7 which, as clearly seen in FIG. 2, are incorporated in bellows 5 between uprights 3 and 4. These leads 6 and 7, which may for example be of copper and have a thickness of about 0.03 mm and a width for instance of 2 mm may be cemented to the inner layer 8 of the bellows, for example of fabric, and covered by an outer layer 9, which may be a foil of plastics material.

It will be apparent that because of the small thickness and width of the leads there is no notable additional bulk and the moveability of the bellows is not impaired by the leads.

The bellows 5 is held on each of the uprights 3 and 4 by a disc 22. in the embodiment illustrated two leads 6 and 7 are provided on the bellows 5. There is however no difficulty in installing a larger number of leads if this should be necessary. All the surfaces of the bellows are available to receive the leads. This applies also to bellows of other construction, for example six-sided bellows or bellows of circular cross section.

I claim:

1. In a bellows assembly for photographic cameras comprising a frame mounting and guiding spaced front and rear uprights, a bellows with inner and out surface connected between said uprights, and means for adjusting the spacing between the uprights to expand or contract the bellows, the improvement in which the bellows incorporates thin electrical leads running between the inner and outer surfaces of the bellows and foldable with the body of the bellows, said leads providing electrical connections between said uprights.

2. A bellows assembly according to claim 1, in which the leads are electrically conductive foil strips.

3. A bellows assembly according to claim 1, in which at least one of the uprights carries a plate to which the ends of the leads are connected.

4. In a bellows assembly for photographic cameras comprising a frame mounting and guiding spaced front and rear uprights, a bellows connected between said uprights, and means for adjusting the spacing between the uprights to expand or contract the bellows, the improvement in which the bellows incorporates thin electrical leads, said leads are cemented to the material of the bellows and covered by a protective layer, said leads electrically connecting said uprights and foldable with the body of the bellows.

5. In a bellows assembly for photographic cameras comprising a frame mounting and guiding spaced front and rear uprights, a bellows connected between said uprights, and means for adjusting the spacing between the uprights to expand or contract the bellows, the improvement in which the bellows incorporates thin electrical leads, said leads are arranged between two layers of the bellows material, said leads electrically connecting said uprights and foldable with the body of the bellows.

6. In a bellows assembly for photographic cameras comprising a frame mounting and guiding spaced front and rear uprights, a bellows connected between and uprights, and means for adjusting the spacing between the uprights to expand or contract the bellows, the improvement in which
 (a) the bellows incorporates thin electrical leads, and
 (b) at least one of said uprights carries a plate to which the ends of said leads are connected by being brazed to said plate, said leads electrically connecting said uprights and foldable with the body of the bellows.

* * * * *